United States Patent [19]

Pegg

[11] 4,073,415

[45] Feb. 14, 1978

[54] GARMENT HANGER SECURITY DEVICE

[76] Inventor: Frank Raymond Pegg, Taurus House, Kingfield Road, Conventry West Midlands, England

[21] Appl. No.: 739,805

[22] Filed: Nov. 8, 1976

[30] Foreign Application Priority Data

Nov. 12, 1975 United Kingdom ............... 46807/75

[51] Int. Cl.$^{2}$ ............................................ A47J 51/093

[52] U.S. Cl. ...................................................... 223/92

[58] Field of Search .................... 223/92, 85, 88; 24/4

[56] References Cited

U.S. PATENT DOCUMENTS

| | | | |
|---|---|---|---|
| 1,713,621 | 5/1929 | Price | 223/92 |
| 3,966,100 | 6/1976 | Nelson | 223/92 |

FOREIGN PATENT DOCUMENTS

| | | | |
|---|---|---|---|
| 376,793 | 5/1964 | Switzerland | 223/92 |

*Primary Examiner*—George H. Krizmanich
*Attorney, Agent, or Firm*—Watson, Cole, Grindle & Watson

[57] ABSTRACT

A garment hanger security device for a garment hanger having a suspension hook wherein a strong flexible member such as a chain or cord is provided having connection means at both ends thereof to the hanger, the flexible member being of a length to pass from one end to the other from the hanger through at least part of a garment such as a sleeve of the latter when the garment is hung on the hanger; locking means being further provided for effecting releasable connection of at least one of said ends of the flexible member to the hanger whereby retention of the garment relative to the hanger and a rail supporting the latter can be obtained. One end of the flexible member is preferably securely connected to the free end of the suspension hook of the hanger.

4 Claims, 2 Drawing Figures

GARMENT HANGER SECURITY DEVICE

DISCLOSURE OF THE INVENTION

The object of this invention is to provide a simple and effective security device applicable to a garment hanger for preventing or deterring to a large extent the theft of a garment from a rail or the like on which it is hung, e.g., on display in a shop or store.

Figure 1:
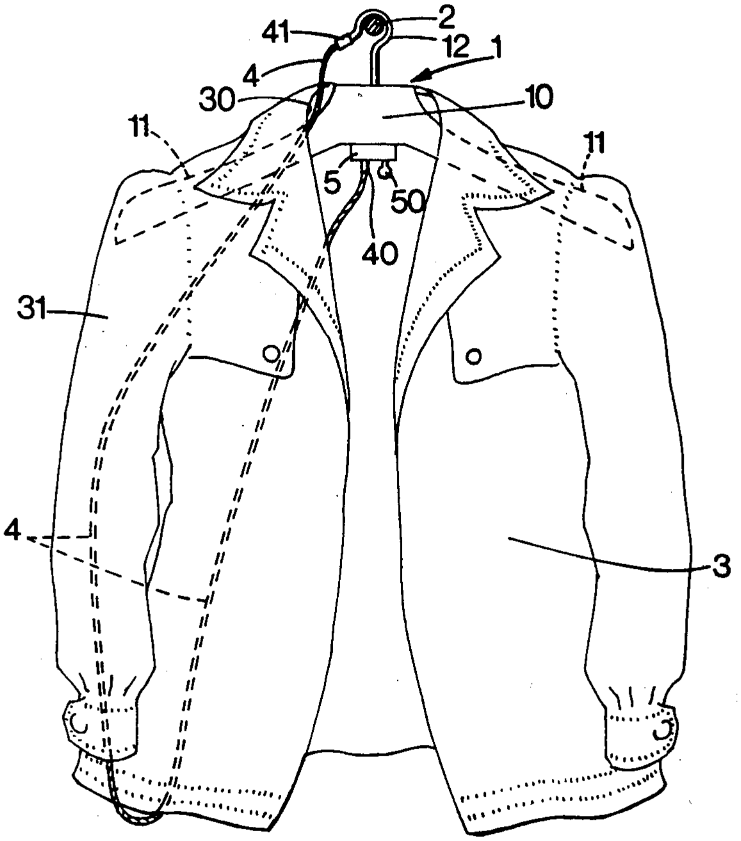
Figure 2:
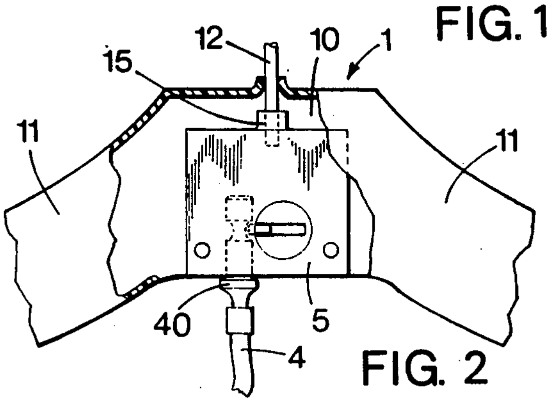

In practice, constructions and arrangements are as follows, reference being had to the accompanying drawings in which:

FIG. 1 is an elevation of a garment hanger provided with the security device, and FIG. 2 is a detail view on an enlarged scale showing a modification.

The hanger 1 is shown of the usual form in which a central body 10 of wood, plastic material or metal provides a pair of arms 11 for supporting a garment such as a coat 3 and is provided with a central suspension hook 12 for hanging on a rail 2.

In the arrangement shown, a strong flexible member 4 such as a chain or cable (e.g. plastic-covered high tensile wire cable), which is highly resistant to being cut or otherwise severed, is attached at one end 41 in a secure and permanent manner to the upper end part of the hook 12 and is arranged to pass from the hook 12 through the neck opening 30 of the coat 3 and down a sleeve 31 of the latter from where it passes upwardly for reception by a lock 5 securely carried in a permanent manner by a central part of the body 10 of the hanger 1.

The end part of the flexible member 4 received by the lock 5 consists of a pin or plunger 40 which is pushed into engagement with the mechanism of the lock 5 and can only be released from the lock 5 by key operation of the latter at 50, i.e., by an authorised person such as a shop assistant.

As will be clearly apparent from the drawing, the device not only prevents removal of the coat 3 free from the hanger 1, but more particularly prevents the coat 3 and hanger 1 from being moved for any appreciable distance from the rail 2. As will also be appreciated, any unauthorised attemp to remove or steal the coat becomes immediately apparent in a conspicuous manner by the positive anchorage to the rail 2 afforded by the device.

Where the garment does not fully open (such as a dress), the cable 4 can be simply passed from the hook 12 via the interior of the garment to the lock 5, the cable 4 also passing externally of the garment. In the case of a sleeveless garment or dress the cable 4 may pass or also pass through an armhole.

In the embodiment shown in FIG. 2, the suspension hook 12 is directly connected at 15 to the body of the lock 5.

Whereas it is preferable to secure the cable 4 to the end of the hook 12 so as to cause the cable 4 to be in effect passed over the rail 1, if desired the permanently secured end 41 of the flexible member or cable 4 may be secured to any convenient part of the hook 12 or hanger body 10 or to the body of the lock 5, in which case the cable 4 is passed over the rail 2 before it is threaded down a sleeve 31 of the garment 3 or otherwise through the latter and inserted at its other end 40 in the lock 5. Thus, where the flexible cable 4 is permanently secured to the lock body at one end and is key-releasably received at its other end in the latter, then only the body of the lock 5 need be permanently secured to the hanger body 10 or incorporated in the latter. Alternatively, in such an arrangement, the body of the lock 5 may be carried by the hook 12, i.e., the hook may be passed through an opening in the lock body so that the latter rests on top of the hanger body 10 in position of use. In such a case direct securing of the lock body to the hanger body 10 is not necessary.

I claim:

1. A garment hanger with means for securing a garment thereto, said garment hanger comprising a central body; a pair of oppositely directed horizontal arms extending from said central body; a central suspension hook attached to said central body and extending away therefrom, said central suspension hook having a terminal upper end part; a strong, flexible means permanently and securely attached at one end to said upper end part of said central suspension hook, said means being of a sufficient length so that it can pass through the sleeve of a garment when the garment is hung on said horizontal arms of said garment hanger; a pin permanently and securely attached to the second end of said strong, flexible means; and a key-operated lock means permanently and securely attached to said central body for receiving said pin; whereby when a garment is hung on said garment hanger and said garment hanger hung on a rail by means of said central suspension hook, and when said strong, flexible means is passed through a sleeve of said garment, said pin is placed in said lock means, said garment is securely connected to said garment hanger and said garment hanger is securely connected to said rail.

2. The garment hanger of claim 1, wherein said strong, flexible means comprises a chain.

3. The garment hanger of claim 1 wherein said strong, flexible means comprises a wire cable having a plastic covering.

4. The garment hanger of claim 1 wherein said central suspension hook is attached to said key-operated lock means.

* * * * *